United States Patent
Weber et al.

(10) Patent No.: US 10,603,640 B2
(45) Date of Patent: *Mar. 31, 2020

(54) POLYARYLENE ETHER SULFONE-POLYMERS FOR MEMBRANE APPLICATIONS

(71) Applicant: BASF SE, Ludwigshafen (DE)

(72) Inventors: Martin Weber, Maikammer (DE); Christian Maletzko, Altrip (DE); Joerg Erbes, Karlsruhe (DE); Tobias Kortekamp, Mannheim (DE); Bastiaan Bram Pieter Staal, Limburgerhof (DE); Thomas Heil, Wachenheim (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,249

(22) Filed: May 3, 2018

(65) Prior Publication Data

US 2018/0250641 A1 Sep. 6, 2018

Related U.S. Application Data

(63) Continuation of application No. 14/917,488, filed as application No. PCT/EP2014/068814 on Sep. 4, 2014, now Pat. No. 10,265,663.

(30) Foreign Application Priority Data

Sep. 9, 2013 (EP) .................................. 13183574

(51) Int. Cl.
| | |
|---|---|
| *B01D 67/00* | (2006.01) |
| *B01D 69/08* | (2006.01) |
| *B01D 71/68* | (2006.01) |
| *B29C 48/88* | (2019.01) |
| *B29K 81/00* | (2006.01) |
| *B29L 31/00* | (2006.01) |
| *C08G 65/40* | (2006.01) |
| *C08G 75/23* | (2006.01) |
| *B29C 48/04* | (2019.01) |
| *B29C 48/05* | (2019.01) |
| *B29C 48/10* | (2019.01) |

(52) U.S. Cl.
CPC ......... *B01D 71/68* (2013.01); *B01D 67/0006* (2013.01); *B01D 69/08* (2013.01); *B29C 48/04* (2019.02); *B29C 48/05* (2019.02); *B29C 48/10* (2019.02); *B29C 48/919* (2019.02); *C08G 65/4056* (2013.01); *C08G 75/23* (2013.01); *B29K 2081/06* (2013.01); *B29L 2031/755* (2013.01)

(58) Field of Classification Search
None
See application file for complete search history.

(56) References Cited

U.S. PATENT DOCUMENTS

| | | |
|---|---|---|
| 4,176,222 A | 11/1979 | Cinderey et al. |
| 5,008,364 A | 4/1991 | Ittemann et al. |
| 5,116,933 A | 5/1992 | Newton |
| 5,194,561 A | 3/1993 | Fischer et al. |
| 5,279,739 A | 1/1994 | Pemawansa |
| 5,436,068 A | 7/1995 | Kobayashi et al. |
| 6,348,152 B1 | 2/2002 | Kawahara |
| 6,365,678 B1 | 4/2002 | Reuter et al. |
| 2002/0010307 A1 | 1/2002 | Schwab |
| 2010/0273953 A1 | 10/2010 | Weber et al. |
| 2011/0174728 A1* | 7/2011 | Eisen .................. B01D 67/0011 210/500.21 |
| 2012/0252962 A1* | 10/2012 | Weber ..................... C08L 81/06 524/539 |
| 2014/0113093 A1 | 4/2014 | Corbin et al. |

FOREIGN PATENT DOCUMENTS

| | | |
|---|---|---|
| CA | 2 842 502 A1 | 2/2013 |
| DE | 199 07 605 A1 | 8/2000 |
| DE | 10 2005 001 599 A1 | 7/2006 |
| EP | 0 135 130 A2 | 3/1985 |
| EP | 0 275 720 A2 | 8/1988 |
| EP | 0 297 363 A2 | 1/1989 |
| EP | 0 412 499 A2 | 2/1991 |
| EP | 0 509 663 B2 | 10/1992 |
| EP | 0 615 778 A1 | 9/1994 |
| EP | 2 554 564 A1 | 2/2013 |
| JP | 4-202431 | 7/1992 |

(Continued)

OTHER PUBLICATIONS

International Search Repot and Written Opinion dated Nov. 11, 2014 in PCT/EP2014/068814.
International Preliminary Report on Patentability dated Mar. 10, 2016 in PCT/EP2014/068814.
E. M. Koch, et al., "Polysulfon" (PSU), Technische Kunststoffe, vol. 80, 1990, 4 pages.
E. Döring, "Polyethersulfon", (PES), Kunststoffe, vol. 80, 1990, 6 pages.
Nicolas Inchaurondo-Nehm, Kunststoffe, vol. 98, 2008, 6 pages.
Nicholas A. Hoenich, et al., "Clinical characterization of a new polymeric membrane for use in renal replacement therapy", Biomaterials, vol. 23, 2002, pp. 3653-3658.
R. N. Johnson, et al., "Poly (eryl Ethers) by Nucleophilic Aromatic Substitution. I. Synthesis and Properties", Journal of Polymer Science Part A-1 vol. 5, 1967, pp. 2375-2398.

(Continued)

*Primary Examiner* — Bradley R Spies
(74) *Attorney, Agent, or Firm* — Oblon, McClelland, Maier & Neustadt, L.L.P.

(57) ABSTRACT

The present invention relates to a method of forming a polyarylene ether sulfone polymer by converting a reaction mixture ($R_G$) comprising a dihalogen component (A1), a dihydroxy component (B1) and potassium carbonate (C1) having a volume-average particle size of <25 μm. The present invention further relates to the polyarylene ether sulfone polymers obtainable by said method, to products obtainable from said polyarylene ether sulfone polymer and to membranes formed from said polyarylene ether sulfone polymer.

18 Claims, No Drawings

(56) References Cited

FOREIGN PATENT DOCUMENTS

| JP | 2007-161619 | 6/2007 |
|---|---|---|
| WO | WO 01/66620 A2 | 9/2001 |
| WO | 2009/019239 | 2/2009 |
| WO | WO 2012/160172 A1 | 11/2012 |

OTHER PUBLICATIONS

R. Viswanathan, et al., "Synthesis, kinetic observations and characteristics of polyarylene ether sulphones prepared via a potassium carbonate DMAC process", POLYMER, vol. 25, 1984, pp. 1827-1836.

Hans R. Kricheldorf, et al., "Macrocycles. 18. The Role of Cyclization in Syntheses of Poly (ether-sulfone) s", Macromolecules, 2001, vol. 34, pp. 8886-8893.

Herman F. Mark, et al., "Encyclopedia of Polymer Science and Technology", third edition vol. 4, 2003, chapter "Polysulfones", pp. 2-8.

Hans R. Kricheldorf, "Aromatic Polyethers", in : Handbook of Polymer Synthesis, second edition 2005, pp. 427-443.

Selvaraj Savariar, et al., "Polysulfone with lower levels of cyclic dimer: Use of MALDITOF in the study of cyclic oligomers", Desalination, vol. 144, 2002, pp. 15-20.

Qian Yang, et al., "Tailoring pore size and pore size distribution of kidney dialysis hollow fiber membranes via dual-bath coagulation approach", Journal of Membrane Science, vol. 290, 2007, pp. 153-163.

Extended European Search Report dated Jul. 10, 2017 in Patent Application No. 17159719.6 (with English translation of categories of cited documents).

"Ultrason—A versatile material for the production of tailor-made membranes", BASF, 2017, 12 pages.

"High-Performance Polymers for Menbranes", Solvay, 2014, 4 pages.

"Brevet EP1272547 issu de la demaode de brevet 01913129.1, Response A La Communication En Date Du 18 Mai 2009 Seton: La Refile 79(1) CBE", Solvay Advaced Polymers L.L.C. Nov. 30, 2009, 7 pages.

Marcel Mulder., "Chapter 3: Basic Principles of Membrane; Technology", Kluwer Academic Publishers, 1996, 7 pages.

Edwards S. Wilks, "Industrial Polymers Handbook: Products, Processes, Applications", Wiley VCH, vol. 3, 2001, 4 pages.

"Membranen: Grundiagen, Vertahren and industrielle Anwendungen", ed. Ohlrogge, et al., Wiley VCH, 2006, 14, pages. (partial translation).

* cited by examiner

POLYARYLENE ETHER SULFONE-POLYMERS FOR MEMBRANE APPLICATIONS

This application is a Continuation of U.S. Non-Provisional application Ser. No. 14/917,488, which was filed on Mar. 8, 2016. U.S. Non-Provisional application Ser. No. 14/917,488 is a National Stage of PCT/EP2014/068814, which was filed on Sep. 4, 2014. This application is based upon and claims the benefit of priority of European Application No. 13183574.6, which was filed on Sep. 9, 2013.

The present invention relates to a method of forming a polyarylene ether sulfone polymer by converting a reaction mixture ($R_G$) comprising a dihalogen component (A1), a dihydroxy component (B1) and potassium carbonate (C1) having a volume-average particle size of <25 µm. The present invention further relates to the polyarylene ether sulfone polymers obtainable by said method, to products obtainable from said polyarylene ether sulfone polymer and to membranes formed from said polyarylene ether sulfone polymer.

Polyarylene ether sulfone polymers are high-performance thermoplastics in that they feature high heat resistance, good mechanical properties and inherent flame retardancy (E. M. Koch, H.-M. Walter, Kunststoffe 80 (1990) 1146; E. Döring, Kunststoffe 80, (1990) 1149, N. Inchaurondo-Nehm, Kunststoffe 98, (2008) 190). Polyarylene ethers are highly biocompatible and so are also used as material for forming dialysis membranes (N. A. Hoenich, K. P. Katapodis, Biomaterials 23 (2002) 3853).

Polyarylene ether sulfone polymers can be formed inter alia either via the hydroxide method, wherein a salt is first formed from the dihydroxy component and the hydroxide, or via the carbonate method.

General information regarding the formation of polyarylene ether sulfone polymers by the hydroxide method is found inter alia in R. N. Johnson et. al., J. Polym. Sci. A-1 5 (1967) 2375, while the carbonate method is described in J. E. McGrath et. al., Polymer 25 (1984) 1827.

Methods of forming polyarylene ether sulfone polymers from aromatic bishalogen compounds and aromatic bisphenols or salts thereof in an aprotic solvent in the presence of one or more alkali metal or ammonium carbonates or bicarbonates are known to a person skilled in the art and are described in EP-A 297 363 and EP-A 135 130 for example.

High-performance thermoplastics such as polyarylene ether sulfone polymers are formed by polycondensation reactions which are typically carried out at a high reaction temperature in dipolar aprotic solvents, for example DMF, DMAc, sulfolane, DMSO and NMP.

Applications of polyarylene ether sulfone polymers in polymer membranes are increasingly important.

EP 0 412 499 describes a method of forming polyarylene ether sulfone polymers. The dihalogen component used in the method of EP 0 412 499 is, for example, 4,4'-dichlorodiphenyl sulfone or 4,4'-difluorodiphenyl sulfone. The dihydroxy components described in EP 0 412 499 include bisphenol A, 4,4'-dihydroxydiphenyl sulfone and 4,4'-dihydroxybenzophenone. The polycondensation described in EP 0 412 499 is carried out in the presence of sodium carbonate or sodium bicarbonate. The finely ground sodium carbonate used has particle sizes (D 90%) of ≤20 µm. Polyarylene ether sulfone polymers obtainable by the method described in EP 0 412 499 have inadequate mechanical properties for membrane applications in particular. Polyarylene ether sulfone polymers obtainable by this method further have a relatively high polydispersity. Moreover, the reaction time to form the polyarylene ether sulfone polymers is too long for a commercial process.

WO 01/66620 describes a method of forming low color polybiphenyl ether sulfone polymers. It is an essential requirement of this method that the dihydroxy component used be not less than 75 mol % and preferably not less than 90 mol % 4,4'-dihydroxybiphenyl. The polybiphenyl ether sulfone polymer described in WO 01/66620 thus contains not less than 75 mol % and preferably not less than 90 mol % of 4,4'-biphenylene units, based on the dihydroxy compound used. 4,4'-Dichlorodiphenyl sulfone for example is described as dihalogen component. The polycondensation is carried out in the presence of a metal carbonate, preferably potassium carbonate, the particle size of which is in the range from 10 to 30 µm. This provides low color polybiphenylene ether sulfone polymers. The polybiphenyl ether sulfone polymers obtainable by the method of WO 01/66620 have inadequate mechanical properties for membrane applications in particular. The polybiphenyl ether sulfone polymers also have a relatively high polydispersity.

The present invention thus has for its object to provide a method of forming polyarylene ether sulfone polymers which does not retain the disadvantages of prior art methods, or only in diminished form. The method shall be performable within short reaction times. Polyarylene ether sulfone polymers obtainable by the method shall exhibit low polydispersity as well as good mechanical properties, particularly with regard to membrane applications. The method shall further provide good buildup of molecular weight within short reaction times.

This object is achieved by the method of forming a polyarylene ether sulfone polymer by converting a reaction mixture ($R_G$) comprising as components:
(A1) a dihalogen component comprising not less than 50 wt % of at least one dihalogen compound selected from the group consisting of 4,4'-dichlorodiphenyl sulfone and 4,4'-difluorodiphenyl sulfone, based on the overall weight of component (A1) in reaction mixture ($R_G$),
(B1) a dihydroxy component comprising not less than 80 wt % of at least one dihydroxy compound selected from the group consisting of 4,4'-dihydroxydiphenyl sulfone, bisphenol A, 4,4'-dihydroxybenzophenone and hydroquinone, based on the overall weight of component (B1) in reaction mixture ($R_G$),
(C) a carbonate component comprising not less than 50 wt % of potassium carbonate having a volume-averaged particle size of <25 µm, based on the overall weight of component (C) in reaction mixture ($R_G$).

The present invention further provides a method of forming a polyarylene ether sulfone polymer by converting a reaction mixture ($R_G$) comprising as components:
(A1) a dihalogen component comprising not less than 50 wt % of at least one dihalogen compound selected from the group consisting of 4,4'-dichlorodiphenyl sulfone and 4,4'-difluorodiphenyl sulfone, based on the overall weight of component (A1) in reaction mixture ($R_G$),
(B1) a dihydroxy component comprising not less than 50 wt % of at least one dihydroxy compound selected from the group consisting of 4,4'-dihydroxydiphenyl sulfone, bisphenol A, 4,4'-dihydroxybenzophenone and hydroquinone, based on the overall weight of component (B1) in reaction mixture ($R_G$),
(C) a carbonate component comprising not less than 50 wt % of potassium carbonate having a volume-averaged particle size of <25 µm, based on the overall weight of component (C) in reaction mixture ($R_G$).

Prior art methods of forming polyarylene ether sulfone polymers usually provide very broad molecular weight distributions. One measure of the distribution of molecular weight is the polydispersity (Q). The polydispersity (Q) is defined as the quotient formed by dividing the number average molecular weight ($M_n$) into the weight average molecular weight ($M_w$). Prior art methods usually provide polydispersities (Q) of distinctly greater than 3.5. Polyarylene ether sulfone polymers having polydispersities (Q) of >4 are only partially suitable for forming membranes in particular.

It is further known from the literature (S. Savariar, G. S. Underwood, E. M. Dickinson, P. J. Schielke, A. S. Hay, Desalination 144 (2002) 15) that removal of cyclic oligomers formed in the synthesis of polysulfone (H. R. Kricheldorf, S. Bohme, G. Schwarz, R.-P. Krüger, G. Schulz, Macromolecules 34 (2001) 8886) improves the stability of spinning solutions for forming hollow fiber membranes. There is also an expectation in the paper by Savariar that removing the cyclic oligomers will also improve the mechanical properties. However, the cyclic oligomers can only be removed by costly and inconvenient fractionation.

The invention further has for its object to provide a method wherein cyclic oligomers need not be removed. The object of the invention is achieved by the method according to the invention.

Reaction Mixture ($R_G$)

The polyarylene ether sulfone polymer according to the invention is formed by converting a reaction mixture ($R_G$) comprising the above-described components (A1), (B1), (C) and optionally (D). Components (A1) and (B1) end up reacting with each other in a polycondensation reaction.

Component (D) serves as solvent. Component (C) serves as base to deprotonate component (B1) during the condensation reaction.

So reaction mixture ($R_G$) is the mixture which is used in the method which the present invention provides for forming the polyarylene ether sulfone polymer. All particulars herein in relation to reaction mixture ($R_G$) thus relate to the mixture which is present before the polycondensation. It is during the method of the present invention that the polycondensation takes place to convert reaction mixture ($R_G$) into the target product, the polyarylene ether sulfone polymer, by polycondensation of components (A1) and (B1). The mixture which is obtained after the polycondensation and comprises the target product, the polyarylene ether sulfone polymer, is also referred to as product mixture ($P_G$).

In general, the components of reaction mixture ($R_G$) are reacted conjointly. The individual components may be mixed in a preceding step and then reacted. It is also possible to feed the individual components into a reactor, where they are mixed and subsequently reacted.

In the method of the present invention, the individual components of reaction mixture ($R_G$) are generally converted conjointly. This conversion preferably takes place in a single stage. That is, the deprotonation of component (B1) and the condensation reaction between components (A1) and (B1) take place in a single reaction stage without isolation of intermediates, for example the deprotonated species of component (B1).

Component (A1)

Component (A1), which is also referred to as the dihalogen component, is present in reaction mixture ($R_G$) in the form of at least one dihalogen compound. What is meant herein by "at least one dihalogen compound" is precisely one dihalogen compound and also mixtures of two or more dihalogen compounds.

So component (A1) may comprise not only a single dihalogen compound but also a mixture of two or more dihalogen compounds.

It is essential for the present invention that component (A1) comprise not less than 50 wt % of at least one dihalogen compound selected from the group consisting of 4,4'-dichlorodiphenyl sulfone and 4,4'-difluorodiphenyl sulfone, based on the overall weight of component (A1) in reaction mixture ($R_G$). The weight percentages here in relation to component (A1) further relate to the sum total of the 4,4'-dichlorodiphenyl sulfone used and of the 4,4'-difluorodiphenyl sulfone used. 4,4'-Dichlorodiphenyl sulfone is preferable to 4,4'-difluorodiphenyl sulfone.

Said 4,4'-dichlorodiphenyl sulfone and 4,4'-difluorodiphenyl sulfone may here be used in pure form or as a technical-grade product, which may comprise up to 2 wt %, preferably up to 1 wt % and more preferably up to 0.5 wt % of impurities, all based on the overall weight of the 4,4'-dichlorodiphenyl sulfone used and/or the 4,4'-difluorodiphenyl sulfone used. Any impurities present are included in the wt % particulars relating to component (A1).

In one embodiment, component (A1) comprises not less than 80 wt %, preferably not less than 90 wt %, and more preferably not less than 98 wt % of at least one dihalogen compound selected from the group consisting of 4,4'-dichlorodiphenyl sulfone and 4,4'-difluorodiphenyl sulfone, based on the overall weight of component (A1) in reaction mixture ($R_G$). The weight percentages here in relation to component (A1) further relate to the sum total of the 4,4'-dichlorodiphenyl sulfone used and of the 4,4'-difluorodiphenyl sulfone used.

Component (A1) may further comprise dihalogen compounds other than 4,4'-dichlorodiphenyl sulfone and 4,4'-difluorodiphenyl sulfone. Component (A1) comprises not more than 50 wt %, preferably not more than 20 wt %, more preferably not more than 10 wt % and especially not more than 2 wt % of other dihalogen compounds.

In one particularly preferred embodiment, component (A1) comprises not less than 50 wt %, preferably not less than 80 wt %, more preferably not less than 90 wt % and especially not less than 98 wt % of 4,4'-dichlorodiphenyl sulfone.

It is further particularly preferable for reaction mixture ($R_G$) not to contain any further dihalogen compounds in addition to the dihalogen compounds of component (A1).

The present invention accordingly also provides a method wherein said reaction mixture ($R_G$) contains no dihalogen compounds in addition to the dihalogen compounds of component (A1).

In a further particularly preferred embodiment, component (A1) consists essentially of at least one dihalogen compound selected from the group consisting of 4,4'-dichlorodiphenyl sulfone and 4,4'-difluorodiphenyl sulfone. What is meant herein by "consisting essentially of" is that component (A1) comprises more than 99 wt %, preferably more than 99.5 wt % and more preferably more than 99.9 wt % of at least one dihalogen compound selected from the group consisting of 4,4'-dichlorodiphenyl sulfone and 4,4'-difluorodiphenyl sulfone, all based on the overall weight of component (A1) in reaction mixture ($R_G$). In these embodiments, 4,4'-dichlorodiphenyl sulfone is particularly preferable for use as component (A1).

In a further particularly preferred embodiment, component (A1) consists essentially of 4,4'-dichlorodiphenyl sulfone. In a further particularly preferred embodiment, component (A1) consists of 4,4'-dichlorodiphenyl sulfone.

Component (B1)

Component (B1), which is also referred to as the dihydroxy component, is present in reaction mixture ($R_G$) in the form of at least one dihydroxy compound. What is meant herein by "at least one dihydroxy compound" is precisely one dihydroxy compound and also mixtures of two or more dihydroxy compounds.

So component (B1) may comprise not only a single dihydroxy compound but also mixtures of two or more dihydroxy compounds.

It is essential for the present invention that component (B1) comprise not less than 50 wt % of at least one dihydroxy compound selected from the group consisting of 4,4'-dihydroxydiphenyl sulfone, bisphenol A (2,2-bis(4-hydroxyphenyl)propane), 4,4'-dihydroxybenzophenone and hydroquinone, based on the overall weight of component (B1) in reaction mixture ($R_G$). The weight percentages here in relation to component (B1) further relate to the sum total of the 4,4'-dihydroxydiphenyl sulfone, bisphenol A (2,2-bis-(4-hydroxyphenyl)propane), 4,4'-dihydroxybenzophenone and hydroquinone used. Of the aforementioned dihydroxy compounds it is 4,4'-dihydroxydiphenyl sulfone and bisphenol A which are preferable, while bisphenol A is particularly preferable.

Said 4,4'-dihydroxydiphenyl sulfone, said bisphenol A (2,2-bis(4-hydroxyphenyl)-propane), said 4,4'-dihydroxybenzophenone and said hydroquinone may here be used in pure form or as a technical-grade product, which may comprise up to 2 wt %, preferably up to 1 wt % and more preferably up to 0.5 wt % of impurities, all based on the overall weight of the 4,4'-dihydroxydiphenyl sulfone used, the bisphenol A (2,2-bis(4-hydroxyphenyl)propane) used, the 4'4-dihydroxybenzophenone used and the hydroquinone used. Any impurities present are included in the wt % particulars relating to component (B1).

In one embodiment, component (B1) comprises not less than 80 wt %, preferably not less than 90 wt % and more preferably not less than 98 wt % of at least one dihydroxy compound selected from the group consisting of 4,4'-dihydroxydiphenyl sulfone, bisphenol A (2,2-bis(4-hydroxyphenyl)propane), 4,4'-dihydroxybenzophenone and hydroquinone, based on the overall weight of component (B1) in reaction mixture ($R_G$). The weight percentages here in relation to component (B1) further relate to the sum total of the 4,4'-dihydroxydiphenyl sulfone, bisphenol A (2,2-bis-(4-hydroxyphenyl)-propane), 4,4'-dihydroxybenzophenone and hydroquinone used.

Component (B1) may further comprise dihydroxy compounds other than 4,4'-dihydroxydiphenyl sulfone, bisphenol A (2,2-bis(4-hydroxyphenyl)propane), 4,4'-dihydroxybenzophenone and hydroquinone. Component (B1) comprises not more than 50 wt %, preferably not more than 20 wt %, more preferably not more than 10 wt % and especially not more than 2 wt % of other dihydroxy compounds.

By way of other dihydroxy compounds there may be used for example any known compound having two phenolic hydroxyl groups. A "phenolic hydroxyl group" for the purposes of the present invention is a hydroxyl group (—OH) in a state of attachment to an aromatic system. Suitable other dihydroxy compounds include, for example, resorcinol (1,3-dihydroxybenzene), dihydroxynaphthalenes, bisphenol TMC (1,1-bis(4-hydroxyphenyl)-3,3,5-trimethylcyclohexane), bisphenol AF (2,2-bis(4-hydroxyphenyl)-hexafluoropropane), 1,1-bis(4-hydroxyphenyl)-3,3-dimethylcyclopentane and/or 4,4'-dihydroxybiphenyl.

In one particularly preferred embodiment, component (B1) comprises not less than 50 wt %, preferably not less than 80 wt %, more preferably not less than 90 wt % and especially not less than 98 wt % of bisphenol A.

In one particularly preferred embodiment, component (B1) comprises not less than 50 wt %, preferably not less than 80 wt %, more preferably not less than 90 wt % and especially not less than 98 wt % of 4,4'-dihydroxydiphenyl sulfone.

It is further particularly preferable for reaction mixture ($R_G$) not to contain any further dihydroxy compounds in addition to the dihalogen compounds of component (B1).

The present invention accordingly also provides a method wherein said reaction mixture ($R_G$) contains no further dihydroxy compounds in addition to the dihalogen compounds of component (B1).

In a further particularly preferred embodiment, component (B1) consists essentially of at least one dihydroxy compound selected from the group consisting of 4,4'-dihydroxydiphenyl sulfone, bisphenol A (2,2-bis(4-hydroxyphenyl)propane), 4,4'-dihydroxybenzophenone and hydroquinone. What is meant herein by "consisting essentially of" is that component (B1) comprises more than 99 wt %, preferably more than 99.5 wt % and more preferably more than 99.9 wt % of at least one dihydroxy compound selected from the group consisting of 4,4'-dihydroxydiphenyl sulfone, bisphenol A (2,2-bis(4-hydroxyphenyl)propane), 4,4'-dihydroxybenzophenone and hydroquinone, all based on the overall weight of component (B1) in reaction mixture ($R_G$). In these embodiments, bisphenol A and 4,4'-dihydroxydiphenyl sulfone are particularly preferable for use as component (B1), while bisphenol A is most preferable.

In a further particularly preferred embodiment, component (B1) consists essentially of bisphenol A. In a further particularly preferred embodiment, component (B1) consists of bisphenol A.

Since reaction mixture ($R_G$) comprises potassium carbonate as component (C), the hydroxyl groups of the dihydroxy compounds used as component (B1) may partly be present in reaction mixture ($R_G$) in deprotonated form.

In one embodiment of the present invention, reaction mixture ($R_G$) does not contain any 4,4'-dihydroxybiphenyl.

Component (C)

Reaction mixture ($R_G$) comprises potassium carbonate as component (C), which is also known as the carbonate component. The potassium carbonate in question is preferably anhydrous.

It is essential for the present invention that component (C) comprise not less than 50 wt % of potassium carbonate having a volume-averaged particle size of <25 μm, based on the overall weight of component (C) in reaction mixture ($R_G$).

The potassium carbonate may be used in pure form or as a technical-grade product, which may comprise up to 2 wt %, preferably up to 1 wt % and more preferably up to 0.5 wt % of impurities, all based on the overall weight of the potassium carbonate used. Any impurities present in the potassium carbonate are included in the wt % particulars relating to component (C).

In one embodiment, component (C) comprises not less than 80 wt %, preferably not less than 90 wt % and more preferably not less than 98 wt % of potassium carbonate having a volume-averaged particle size of <25 μm, based on the overall weight of component (B1) in reaction mixture ($R_G$).

Component (C) may further comprise carbonate compounds other than potassium carbonate. Component (C)

comprises not more than 50 wt %, preferably not more than 20 wt %, more preferably not more than 10 wt % and especially not more than 2 wt % of other carbonate compounds.

As other carbonate compounds there may be used for example ammonium carbonate, ammonium bicarbonate, lithium carbonate, lithium bicarbonate, sodium carbonate, sodium bicarbonate, potassium bicarbonate and also alkaline earth metal carbonates and alkaline earth metal bicarbonates.

In one preferred embodiment, component (C) consists essentially of potassium carbonate. What is meant herein by "consisting essentially of" is that component (C) contains more than 99 wt %, preferably more than 99.5 wt % and more preferably more than 99.9 wt % of potassium carbonate, all based on the overall weight of component (C) in reaction mixture ($R_G$).

In one particularly preferred embodiment, component (C) consists of potassium carbonate.

It is further particularly preferable for reaction mixture ($R_G$) not to contain any further carbonate compounds in addition to component (C), especially no sodium carbonate or sodium bicarbonate. In one preferred embodiment, reaction mixture ($R_G$) does not contain any sodium carbonate nor any sodium bicarbonate.

Preferred potassium carbonate has a volume-weighted average particle size (D[4,3]) of less than 25 μm. The volume-weighted average particle size (D[4,3]) of potassium carbonate is determined using a particle size measurement appliance in a suspension of potassium carbonate in a mixture of chlorobenzene and sulfolane. The volume-averaged particle size (D[4,3]) may be determined using, for example, a Mastersizer 2000 from Malvern, on a suspension of particles in chlorobenzene/sulfolane (60/40).

Potassium carbonate having a volume-averaged particle size (D[4,3]) below 15 μm is particularly preferable. Particularly preferable potassium carbonate has a volume-averaged particle size (D[4,3]) in the range from 20 nm to <25 μm. Especially preferred potassium carbonate has a volume-averaged particle size in the range from 20 nm to 15 μm.

The present invention accordingly also provides a method wherein potassium carbonate has a volume-averaged particle size in the range from 20 nm to <25 μm, preferably in the range from 20 nm to 15 μm.

Component (D)

Reaction mixture ($R_G$) optionally comprises at least one aprotic polar solvent as component (D). What is meant by "at least one aprotic polar solvent" in the present invention is exactly one aprotic polar solvent and mixtures of two or more aprotic polar solvents.

Useful aprotic polar solvents include for example, anisole, dimethylformamide, dimethyl sulfoxide, sulfolane, N-methyl-2-pyrrolidone, N-ethyl-2-pyrrolidone and also mixtures thereof.

N-Methyl-2-pyrrolidone, N-ethyl-2-pyrrolidone and also mixtures thereof are preferable for use as aprotic polar solvent. N-Methyl-2-pyrrolidone is particularly preferable for use as aprotic polar solvent.

The present invention accordingly also provides a method wherein said reaction mixture ($R_G$) comprises as component (D) one or more aprotic polar solvents selected from the group consisting of anisole, dimethylformamide, dimethyl sulfoxide, sulfolane, N-methyl-2-pyrrolidone and N-ethyl-2-pyrrolidone.

The present invention accordingly also provides a method wherein reaction mixture ($R_G$) comprises N-methyl-2-pyrrolidone as component (D).

In one preferred embodiment, component (D) comprises not less than 50 wt % of at least one solvent selected from the group consisting of N-methyl-2-pyrrolidone and N-ethyl-2-pyrrolidone, based on the overall weight of component (D) in reaction mixture ($R_G$). N-Methyl-2-pyrrolidone is particularly preferable for use as component (D).

In one further embodiment, component (D) consists essentially of at least one solvent selected from the group consisting of N-methyl-2-pyrrolidone and N-ethyl-2-pyrrolidone. What is meant herein by "consisting essentially of" is that component (D) comprises more than 99 wt %, more preferably more than 99.5 wt % and more preferably more than 99.9 wt % of one or more aprotic polar solvents selected from the group consisting of N-methyl-2-pyrrolidone and N-ethyl-2-pyrrolidone, all based on the overall weight of component (D) in reaction mixture ($R_G$), while N-methyl-2-pyrrolidone is preferable.

In one preferred embodiment, component (D) consists of N-methyl-2-pyrrolidone. N-Methyl-2-pyrrolidone is also known as NMP or N-methylpyrrolidone.

In a further preferred embodiment, the reaction mixture does not contain any further aprotic polar solvents in addition to the aprotic polar solvents of component (D).

A reaction mixture ($R_G$) is particularly preferable wherein next said component (A1) comprises not less than 50 wt %, preferably not less than 90 wt %, more preferably not less than 95 wt %, of 4,4'-dichlorodiphenyl sulfone, based on the overall weight of component (A1) in reaction mixture ($R_G$), said component (B1) comprises not less than 50 wt %, preferably not less than 90 wt %, more preferably not less than 95 wt %, of 4,4'-dihydroxydiphenyl sulfone, based on the overall weight of component (B1) in reaction mixture ($R_G$), said component (C) consists essentially of potassium carbonate having a volume-averaged particle size of <25 μm, and said component (D) consists essentially of N-methylpyrrolidone.

A reaction mixture ($R_G$) is further particularly preferable wherein next said component (A1) comprises not less than 50 wt %, preferably not less than 90 wt %, more preferably not less than 95 wt %, of 4,4'-dichlorodiphenyl sulfone, based on the overall weight of component (A1) in reaction mixture ($R_G$), said component (B1) comprises not less than 50 wt %, preferably not less than 90 wt %, more preferably not less than 95 wt %, of bisphenol A, based on the overall weight of component (B1) in reaction mixture ($R_G$), said component (C) consists essentially of potassium carbonate having a volume-averaged particle size of <25 μm, and said component (D) consists essentially of N-methylpyrrolidone.

The ratio of components (A1) and (B1) in reaction mixture ($R_G$) may vary between wide limits. The molar ratio of component (B1) to (A1) is preferably in the range from 0.95 to 1.05:1, preferably in the range from 0.97 to 1.03:1.

Polyarylene Ether Sulfone Polymer

To form the polyarylene ether sulfone polymer of the present invention, reaction mixture ($R_G$) is reacted under conditions of the carbonate method. The reaction involved is a polycondensation reaction and is generally carried out at temperatures in the range from 80 to 250° C. and preferably at temperatures in the range from 100 to 220° C., the upper limit of the temperature being determined by the boiling point of the aprotic polar solvent (component D) at atmospheric pressure (1013.25 mbar). The reaction is generally carried out at atmospheric pressure. The time interval for the reaction is preferably in the range from 2 to 12 hours, especially in the range from 3 to 10 hours.

The polyarylene ether sulfone polymer obtained according to the present invention may be isolated by precipitating the polymer solution in water or mixtures of water with further solvents, for example. The precipitated polyarylene ether sulfone polymer may subsequently be extracted with water and thereafter dried. In one embodiment of the invention, the precipitation may also take place in an acidic medium. Suitable acids include, for example, organic or inorganic acids, for example carboxylic acids such as acetic acid, propionic acid, succinic acid or citric acid, and also mineral acids such as, for example, hydrochloric acid, sulfuric acid or phosphoric acid.

The method of the present invention provides polyarylene ether sulfone polymers having low polydispersities (Q).

The present invention accordingly also provides a polyarylene ether sulfone polymer that is obtainable by the method of the present invention.

The polyarylene ether sulfone polymer has a polydispersity (Q) of generally ≤4, and preferably ≤3.5.

The polydispersity (Q) is defined as the quotient formed by dividing the number average molecular weight ($M_n$) into the weight average molecular weight ($M_w$). In one preferred embodiment, the polydispersity (Q) of the polyarylene ether sulfone polymer is in the range from 2.0 to ≤4 and preferably in the range from 2.0 to ≤3.5.

The weight average molecular weight ($M_W$) and the number average molecular weight ($M_n$) are measured using gel permeation chromatography.

The polydispersity (Q) and the average molecular weight of the polyarylene ether sulfone polymer were measured using gel permeation chromatography (GPC). Dimethylacetamide (DMAc) was used as solvent and narrowly distributed polymethyl methacrylate was used as standard in the measurement.

Suitable methods of forming the aforementioned polyarylene ether sulfone polymers are known per se to a person skilled in the art and are described, for example, in Herman F. Mark, "Encyclopedia of Polymer Science and Technology", third edition, Volume 4, 2003, chapter "Polysulfones" on pages 2 to 8 and also in Hans R. Kricheldorf, "Aromatic Polyethers" in: Handbook of Polymer Synthesis, second edition, 2005 on pages 427 to 443.

Preferred polyarylene ether sulfone polymers comprise at least one of the following building blocks Ia to Ib as structural repeat units:

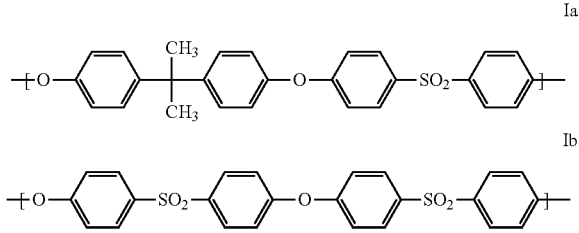

Ia

Ib

It is also particularly preferable for the polyarylene ether sulfone polymer to be constructed essentially of at least one variety of building blocks selected from the group consisting of Ia and Ib.

Particular preference is given to polyarylene ether sulfone polymers constructed of repeat units of formula Ia. Polysulfone (PSU) is another appellation for these polyarylene ether sulfone polymers.

Particular preference is further given to polyarylene ether sulfone polymers constructed of repeat units of formula Ib. Polyether sulfone (PESU) is another appellation for these polyarylene ether sulfone polymers.

Abbreviations such as PESU and PSU herein conform to DIN EN ISO 1043-1 (Plastics—Symbols and abbreviated terms—Part 1: Basic polymers and their special characteristics (ISO 1043-1:2001); German version of EN ISO 1043-1:2002).

Particular preference is further given to block or other copolymers constructed of repeat units of formulae Ia and Ib.

The weight average molecular weight ($M_W$) of the polyarylene ether sulfone polymer obtainable by the method of the present invention is generally in the range from 10 000 to 150 000 g/mol, preferably in the range from 15 000 to 120 000 g/mol and more preferably in the range from 18 000 to 100 000 g/mol. The weight average molecular weights ($M_W$) are measured using gel permeation chromatography (GPC). This measurement is carried out as described above.

The terminal groups of the polyarylene ether sulfone polymers depend on the reaction conditions and the molar ratios of components (A1) and (B1) and are generally either halogen groups, in particular chlorine groups, or etherified groups, in particular alkyl ether groups. Etherified end groups are obtainable by reacting the terminal OH/phenoxide groups with suitable etherifying agents.

Examples of suitable etherifying agents are monofunctional alkyl or aryl halides, for example $C_1$-$C_6$ alkyl chlorides, bromides or iodides, preferably methyl chloride, or benzyl chloride, bromide or iodide, or mixtures thereof. The terminal groups of the polyarylene ether sulfone polymer according to the present invention are preferably halogen groups, in particular chlorine, and also alkoxy groups, in particular methoxy, aryloxy groups, in particular phenoxy, or benzyloxy.

Owing to their low hydrophilicity and hence good resistance to hydrolysis, polyarylene ether sulfone polymers, particularly linear polyarylene ether sulfone polymers, have long been used as membrane materials. The use of polysulfone for forming dialysis membranes is for instance described by S. Savariar et al., Desalination 144 (2002) 15 to 20. Since polysulfone absorbs relatively little water, dialysis membranes of this type are typically formed using a hydrophilic polymer, for example polyvinylpyrrolidone (PVP), as an additive.

DE-A 10 2005 001 599 describes functionalized branched polyarylene ether sulfone copolymers comprising sulfonated and nonsulfonated units. The sulfonated polyarylene ether sulfone copolymers are formed by sulfonating the corresponding branched polyarylene ether sulfone copolymers. The publication mentions the use of the sulfonated copolymers for forming membranes. Polymer blends formed from the aforementioned sulfonated polyarylene ether sulfone copolymers and numerous blending components, including polyvinylpyrrolidone, are also mentioned. However, DE-A 10 2005 001 599 neither discloses blends of nonsulfonated branched polyarylene ether sulfone polymers nor goes into the special requirements for use in the manufacture of hollow fiber membranes.

In one preferred embodiment, polyarylene ether sulfone polymers are not subjected to sulfonation in the method which the present invention provides for forming polyarylene ether sulfone polymers. In a further preferred embodiment, therefore, polyarylene ether sulfone polymers obtainable by the method of the present invention do not contain any free sulfonic acid groups.

The use in the manufacture of hollow fiber membranes for dialysis modules places special requirements on the polymer material. These relate particularly to the separation performance and the cutoff with regard to the molecular weight and thus the ability to filter out certain toxins during dialysis, and also a high level of stability under the conditions of the sterilization process and a high level of stability for the properties of the membrane over a long period.

EP 0 509 663 B2, for example, describes dialysis modules comprising selectively permeable hollow fiber membranes based on a mixture of polyether sulfone and of a hydrophilic polymer such as, for example, polyvinylpyrrolidone or polyethylene glycol. EP 0 615 778 A1 discloses a method of forming hydrophilic membranes by the use of hydrophobic polymers such as polyether sulfones and hydrophilic polymers by use of polyvinylpyrrolidone.

However, mechanical properties in sustained use, ease of use during manufacture and separation performance, in particular the cutoff (defined as the molecular weight above which removal is achieved) are not always satisfactory with the materials used in existing dialysis membranes.

Membranes utilizing the polyarylene ether sulfone polymer obtainable by the method of the present invention are obtainable by application of methods or steps known per se to a person skilled in the art.

The present invention also provides a method of forming a membrane comprising the steps of:
(i) providing a solution comprising the polyarylene ether sulfone polymer according to the invention and at least one aprotic polar solvent, and
(ii) separating the polyarylene ether sulfone polymer according to the invention from the aprotic polar solvent to form a membrane.

To increase membrane hydrophilicity, at least one hydrophilic polymer may be admixed to the solution provided in step (i). One example of a suitable hydrophilic polymer is polyvinylpyrrolidone having a weight average molecular weight ($M_w$) in the range from 10 000 to 2 000 000 g/mol, preferably in the range from 200 000 to 1 600 000 g/mol.

The present invention also provides a method of forming a membrane comprising the steps of:
(i) providing a solution comprising the polyarylene ether sulfone polymer according to the invention, at least one hydrophilic polymer and at least one aprotic polar solvent, and
(ii) separating the mixture of the polyarylene ether sulfone polymer according to the invention and the hydrophilic polymer from the aprotic polar solvent to form a membrane.

In step (i), therefore, a solution of the polyarylene ether sulfone polymer and optionally of the hydrophilic polymer in an aprotic polar solvent is provided. Aprotic polar solvents considered for use are those in which the polyarylene ether sulfone polymers are soluble, where "soluble" is to be understood as meaning that the amount of the polyarylene ether sulfone polymer that dissolves in the aprotic polar solvent at room temperature (20° C.) is not less than 10 wt %, preferably not less than 20 wt % and especially not less than 25 wt %, based on the overall weight of the solution.

Preferably, the solution obtained in step (i) is devolatilized prior to the execution of step (ii). A person skilled in the art will choose customary, generally/commonly known methods to devolatilize liquids.

Preferred aprotic polar solvents for providing the solution in step (i) are N-methylpyrrolidone, dimethylacetamide, dimethyl sulfoxide, dimethylformamide and sulfolane (tetrahydrothiophene 1,1-dioxide). N-Methylpyrrolidone, dimethylacetamide, dimethyl sulfoxide and dimethylformamide are particularly preferable.

Forming the solution in step (i) may be effected in customary vessels, in particular in those which comprise a stirring device and preferably a temperature control device. Forming the solution as per step (i) of the method according to the present invention is preferably effected under agitation. Dissolving the polyarylene ether sulfone polymer of the present invention and optionally the hydrophilic polymer may be effected concurrently or in succession.

The duration of step (i) may vary between wide limits. The duration of step (i) is preferably in the range from 10 minutes to 48 hours, especially in the range from 10 minutes to 12 hours and more preferably in the range from 15 minutes to 6 hours. A person skilled in the art will choose the duration of step (i) so as to obtain a homogeneous solution for the polyarylene ether sulfone polymer according to the present invention and optionally the hydrophilic polymer in the aprotic polar solvent.

Step (i) is preferably carried out at elevated temperature, especially in the range from 20° C. to 120° C., preferably in the range from 40° C. to 100° C. A person skilled in the art will choose the temperature in accordance with the aprotic polar solvent in particular.

The preferred concentration for the polyarylene ether sulfone polymer according to the present invention and optionally the hydrophilic polymer in the aprotic polar solvent depends on the nature of step (ii) in particular.

The concentration of the polyarylene ether sulfone polymer according to the present invention in the solution provided in step (i) is preferably in the range from 5 to 40 wt % and especially in the range from 10 to 30 wt %, based on the overall weight of the solution.

When the solution provided in step (i) further comprises a hydrophilic polymer, the total amount of the polyarylene ether sulfone polymer according to the present invention and of the hydrophilic polymer is in the range from 5 to 40 wt % and especially in the range from 10 to 30 wt %, based on the overall weight of the solution.

In this case, the wt % ratio of polyarylene ether sulfone polymer according to the present invention to hydrophilic polymer in the solution in step (i) is generally in the range from 98:2 to 50:50.

Step (ii) subsequently comprises separating the polyarylene ether sulfone polymer according to the present invention, or as the case may be the mixture of the polyarylene ether sulfone polymer according to the present invention and the hydrophilic polymer, from the aprotic polar solvent to form a membrane.

In principle, the form of the membrane can vary, in which case the membrane is particularly in the form of a foil, in the form of a layer on a backing or in the form of a fiber. In one preferred embodiment, the membrane according to the present invention is a hollow fiber membrane, in particular a hollow fiber membrane for dialysis applications.

When the method of the present invention is used to form hollow fiber membranes, step (ii) is preferably carried out by wet spinning; that is, the solution formed in step (i) is wet-spun in step (ii) to give a fiber. When step (ii) utilizes a wet-spinning process, it is a dry-jet wet-spinning process which is particularly preferable.

In a dry-jet wet-spinning process for the purposes of the present invention, step (ii) comprises the steps of:

(ii-a) extruding the solution of step (i) from a die into a gaseous atmosphere, in particular air, in the presence or absence of a core liquid, and (ii-b) introducing the fiber extruded in step (ii-a) into at least one coagulation bath each comprising a container and a coagulation liquid.

The present invention accordingly also provides a method wherein step (ii) comprises the steps of:

(ii-a) extruding the solution of step (i) from a die into a gaseous atmosphere in the presence or absence of a core liquid to obtain an extruded fiber, and (ii-b) introducing the fiber extruded in step (ii-a) into at least one coagulation bath comprising a container and a coagulation liquid.

A specific die, with core, is customarily used here, and a core liquid is flushed through during the spinning process. A core liquid for the purposes of the present invention is to be understood as meaning a liquid which comes into contact with the solution provided in step (i) in the core of the spinneret die. The core liquid has coagulating properties and serves to stabilize the core of the hollow fiber during the wet-spinning process.

The gap between the die and the coagulation liquid in the coagulation bath is known as the dry zone and is preferably from 0.1 to 100 cm, in particular from 0.5 to 50 cm and preferably from 1 to 30 cm.

The structure of the pores in the hollow fiber membrane is influenced by the coagulation liquid, in which the polyarylene ether sulfone polymer of the present invention or as the case may be the mixture of the polyarylene ether sulfone polymer of the present invention and the hydrophilic polymer is preferably insoluble or incompletely soluble. The coagulation liquid causes the polymer to be spun to at least partially precipitate in the coagulation bath in the form of a fiber.

The coagulation and core liquids used are preferably liquids which are fully miscible with the aprotic polar solvent of the solution provided in step (i) as long as the polyarylene ether sulfone polymer of the present invention, or the mixture of the polyarylene ether sulfone polymer of the present invention and the hydrophilic polymer, is insoluble or partially insoluble in the coagulation liquid.

A person skilled in the art will choose core and coagulation liquids in relation to the aprotic polar solvent of the solution provided in step (i) such that the liquids are firstly miscible and secondly removable, i.e., recoverable in pure form, preferably by distillation, after spinning.

The core liquid used is preferably a mixture of the aprotic polar solvent and deionized water, in particular N-methylpyrrolidone and water. The mixing ratio (weight ratio) of NMP to water is preferably in the range from 15:1 to 1:15, more preferably in the range from 5:1 to 1:5 and especially in the range from 2:1 to 1:2.

The coagulation liquid used is preferably at least one aliphatic alcohol or water or a mixture thereof. It is particularly preferable for step (ii-b) of the method according to the present invention to employ an aliphatic alcohol, in particular ethanol or isopropanol, optionally mixed with water, in a first coagulation bath and water in a second coagulation bath.

The form in which the polyarylene ether sulfone polymer of the present invention is used in the method which the present invention provides for forming a membrane is preferably anhydrous. "Anhydrous" is to be understood as meaning that the water content of the solution provided in step (i) is less than 5 wt %, preferably less than 2 wt % and especially less than 1 wt %, based on the overall weight of the solution.

The polyarylene ether sulfone polymer of the present invention may be dried using methods known to a person skilled in the art, in particular the employment of elevated temperature and/or vacuum.

After steps (i) and (ii) of the method according to the present invention have been carried out, the membrane is optionally subjected to (iii) finishing, which comprises one or more steps selected from cleaning, washing and post-crosslinking.

The present invention also provides the membrane which is obtainable by the method of the present invention.

The membranes of the present invention, in particular the hollow fiber membranes of the present invention, possess a high level of mechanical robustness in sustained use. They have a low cutoff in relation to ultrafiltration, in particular dialysis.

The present invention also provides a membrane comprising the polyarylene ether sulfone polymer of the present invention. The present invention further provides a membrane obtainable by the method which the present invention provides for forming a membrane.

The present invention accordingly also provides a hollow fiber for dialysis, obtainable by the method of the present invention.

The present invention further provides a method of using the polyarylene ether sulfone polymer obtainable by the method of the present invention to form membranes.

The present invention is more particularly elucidated by the examples which follow without being restricted thereto.

Components Used:

DCDPS: 4,4'-dichlorodiphenyl sulfone
bisphenol A: 2,2-bis(4-hydroxyphenyl) propane
dihydroxybiphenyl: 4,4'-dihydroxybiphenyl
potassium carbonate: $K_2CO_3$, anhydrous, volume-averaged particle size (see table)
sodium carbonate: $Na_2CO_3$, anhydrous, volume-averaged particle size (see table)
NMP: N-methylpyrrolidone, anhydrous
$M_n$, $M_W$ and Q were determined as described above.

The viscosity number VN was measured to DIN ISO 1628-1 in a 1 wt % NMP solution at 25° C.

The polyaryl ether sulfone polymers are isolated by dropletization of an NMP solution of the polymers in completely ion-free water at room temperature (20° C.). Height of drop is 0.5 m. Throughput is about 2.5 l per hour. The beads obtained are subsequently extracted with water at 85° C. for twenty hours (water throughput 160 l/h). Thereafter, the beads are dried to a residual moisture content of less than 0.1 wt % by drying at a temperature below the glass transition temperature $T_g$.

The volume-averaged particle size (D[4,3]) of the potassium/sodium carbonate used was determined with a Mastersizer 2000 from Malvern on a suspension of the particles in chlorobenzene/sulfolane (60/40).

The molecular weight distribution of the polyaryl ether sulfone polymers was determined by GPC measurement in DMAc. The molecular weights of the polyaryl ether sulfone polymers were also characterized by viscosity measurements (1 wt % solution in NMP).

Cyclic dimer content was determined via HPLC with THF as liquid phase and PLGEL® columns.

The advantageous properties of the polyaryl ether sulfone polymers according to the present invention for membrane applications were demonstrated in the following tests:

The solutions for forming the hollow fiber membrane were formed as follows: First, the polyaryl ether sulfone polymer was dissolved in NMP. Polyvinylpyrrolidone (PVP, $M_w$=360 000 g/mol, $T_g$=176° C., from Merck) was then added to this solution until the composition reached was 16/10/74 wt % (polyaryl ether sulfone polymer/PVP/NMP). This solution was subsequently stirred at room temperature for 48 h. The solutions were devolatilized for 1 day prior to spinning.

The hollow fiber membranes were formed in the dry-jet wet-spinning process described in the publication Q. Tang, T. S. Chung, Y. E. Santoso, Journal of Membrane Science, 2007, 290, pages 153-163.

The composition of the core liquid used was 55:45 parts by weight of NMP:deionized water. The distance between the spinneret die and the precipitation bath was 20 cm. A 2-stage precipitation process was used, with isopropanol as the first coagulation liquid in the first precipitation bath and water as the second coagulation liquid in the second precipitation bath. Fiber withdrawal speed was equal to spinning speed (8.6 cm/s). The fibers were subsequently stored in water for 3 days. Prior to tensile elongation measurement, the fibers are removed from the water, externally adherent water is removed, and the samples are then stored for 48 hours at 23° C. and 50% relative humidity. Thereafter, the fibers are cut to a length of 150 mm and tested to breakage in a Z010 Zwick/Roell tensile elongation apparatus at an extension rate of 20 mm/min.

Table 1 lists the test results.

Formation of polyaryl ether sulfone polymers:

Comparative: Polysulfone V1

In a 4 L reactor equipped with internal thermometer, gas inlet tube, reflux condenser with water trap, 430.62 g of DCDPS, 342.08 g of bisphenol A and 222.86 g of potassium carbonate having a volume-averaged particle size of 32.4 µm were suspended in 641 ml of NMP under nitrogen. The batch is heated to 190° C. over 1 h. Residence time at 190° C. is considered to be the reaction time. The water of reaction is distilled off while a constant fill level is maintained by adding NMP during the reaction. After 8 h reaction time, the reaction is discontinued by dilution with cold NMP (1609 ml) before methyl chloride (10 l/h) is introduced into the batch at 140° C. for 45 minutes. Nitrogen is then introduced at a rate of 20 l/h and the batch is cooled down. The potassium chloride formed is filtered off.

Inventive: Polysulfone 2

In a 4 L reactor equipped with internal thermometer, gas inlet tube, reflux condenser with water trap, 430.62 g of DCDPS, 342.08 g of bisphenol A and 222.86 g of potassium carbonate having a volume-averaged particle size of 22.4 µm were suspended in 641 ml of NMP under nitrogen. The batch is heated to 190° C. over 1 h. Residence time at 190° C. is considered to be the reaction time. The water of reaction is distilled off while a constant fill level is maintained by adding NMP during the reaction. After 6.5 h reaction time, the reaction is discontinued by dilution with cold NMP (1609 ml) before methyl chloride (10 l/h) is introduced into the batch at 140° C. for 45 minutes. Nitrogen is then introduced at a rate of 20 l/h and the batch is cooled down. The potassium chloride formed is filtered off.

Inventive: Polysulfone 3

In a 4 L reactor equipped with internal thermometer, gas inlet tube, reflux condenser with water trap, 430.62 g of DCDPS, 342.08 g of bisphenol A and 222.86 g of potassium carbonate having a volume-averaged particle size of 12.4 µm were suspended in 641 ml of NMP under nitrogen. The batch is heated to 190° C. over 1 h. Residence time at 190° C. is considered to be the reaction time. The water of reaction is distilled off while a constant fill level is maintained by adding NMP during the reaction. After 5 h reaction time, the reaction is discontinued by dilution with cold NMP (1609 ml) before methyl chloride (10 l/h) is introduced into the batch at 140° C. for 45 minutes. Nitrogen is then introduced at a rate of 20 l/h and the batch is cooled down. The potassium chloride formed is filtered off.

Comparative: Polysulfone V4

In a 4 L reactor equipped with internal thermometer, gas inlet tube, reflux condenser with water trap, 430.62 g of DCDPS, 342.08 g of bisphenol A and 170.91 g of sodium carbonate having a particle size of 23.2 µm were suspended in 641 ml of NMP under nitrogen. The batch is heated to 190° C. over 1 h. Residence time at 190° C. is considered to be the reaction time. The water of reaction is distilled off while a constant fill level is maintained by adding NMP during the reaction. After 9 h reaction time, the reaction is discontinued by dilution with cold NMP (1609 ml) before methyl chloride (10 l/h) is introduced into the batch at 140° C. for 45 minutes. Nitrogen is then introduced at a rate of 20 l/h and the batch is cooled down. The sodium chloride formed is filtered off.

Comparative: Polysulfone V5

In a 4 L reactor equipped with internal thermometer, gas inlet tube, reflux condenser with water trap, 430.62 g of DCDPS, 342.08 g of bisphenol A and 170.91 g of sodium carbonate having a particle size of 11.9 µm were suspended in 641 ml of NMP under nitrogen. The batch is heated to 190° C. over 1 h. Residence time at 190° C. is considered to be the reaction time. The water of reaction is distilled off while a constant fill level is maintained by adding NMP during the reaction. After 9 h reaction time, the reaction is discontinued by dilution with cold NMP (1609 ml) before methyl chloride (10 l/h) is introduced into the batch at 140° C. for 45 minutes. Nitrogen is then introduced at a rate of 20 l/h and the batch is cooled down. The sodium chloride formed is filtered off.

Comparative: PPSU V6

In a 4 L reactor equipped with internal thermometer, gas inlet tube, reflux condenser with water trap, 574.16 g of DCDPS, 379.87 g of dihydroxybiphenyl and 286.09 g of potassium carbonate having a particle size of 23.2 µm were suspended in 2100 ml of NMP under nitrogen. The batch is heated to 190° C. over 1 h. Residence time at 190° C. is considered to be the reaction time. The water of reaction is distilled off while a constant fill level is maintained by adding NMP during the reaction. After 6 h reaction time, the reaction is discontinued by dilution with cold NMP (900 ml) before methyl chloride (10 l/h) is introduced into the batch at 140° C. for 45 minutes. Nitrogen is then introduced at a rate of 20 l/h and the batch is cooled down. The potassium chloride formed is filtered off.

TABLE 1

| polyarylene ether sulfone polymer | V1 | 2 | 3 | V4 | V5 | V6 |
|---|---|---|---|---|---|---|
| $K_2CO_3$ particle size [μm] | 32.4 | 22.4 | 12.4 | — | — | 23.2 |
| $Na_2CO_3$ particle size [μm] | — | — | — | 23.2 | 11.98 | — |
| reaction time [h] | 8 | 6.5 | 5 | 9 | 9 | 6 |
| VN [ml/g] | 77.4 | 78.2 | 78.7 | 21.5 | 22.3 | 73.9 |
| cyclic dimer [wt %] | 1.07 | 1.08 | 1.08 | — | — | — |
| GPC | | | | | | |
| Mw [g/mol] | 67 890 | 68 540 | 69 450 | — | — | 61 400 |
| Mn [g/mol] | 16 550 | 21 390 | 23 450 | — | — | 16 140 |
| Mw/Mn | 4.1 | 3.1 | 3.0 | — | — | 3.8 |
| εBreak [%] | 41+/−5 | 67+/−5 | 65+/−4 | — | — | — |

Hollow Fiber Membrane

The polyarylene ether sulfone polymers of the present invention combine shorter reaction time with comparable viscosity numbers (VN), but narrower molecular weight distribution. Hollow fiber membranes formed from these polyarylene ether sulfone polymers surprisingly have superior mechanical properties. Tests V4 and V5 show that the use of sodium carbonate does not ensure adequate molecular weight buildup, so no further analyses were carried out. Example V6 shows that PPSU has a broader molecular weight distribution. A hollow fiber membrane could not be formed from the polyarylene ether sulfone polymer as per Example V6 under the experimental conditions chosen for V1, 2 and 3.

We claim:

1. A polyarylene ether sulfone polymer, comprising in polymerized form:
   (A1) a dihalogen component comprising not less than 50 wt % of at least one dihalogen compound selected from the group consisting of 4,4'-dichlorodiphenyl sulfone and 4,4'-difluorodiphenyl sulfone, based on the overall weight of component (A1); and
   (B1) a dihydroxy component comprising not less than 80 wt % of at least one dihydroxy compound selected from the group consisting of bisphenol A and 4,4'-dihydroxybenzophenone, based on the overall weight of component (B1),
   wherein the polyarylene ether sulfone polymer has a polydispersity (Q) from 2.0 to ≤4, wherein Q is defined as the quotient formed by dividing the number average molecular weight ($M_n$) into the weight average molecular weight ($M_w$) measured using gel permeation chromatography (GPC), using dimethylacetamide (DMAc) as solvent and narrowly distributed polymethyl methacrylate as standard.

2. The polyarylene ether sulfone polymer according to claim 1, comprising repeat units of formula Ia:

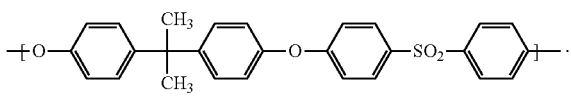

3. The polyarylene ether sulfone polymer according to claim 1, wherein terminal groups of the polyarylene ether sulfone polymer comprise halogen and alkoxy groups.

4. The polyarylene ether sulfone polymer according to claim 1, wherein terminal groups of the polyarylene ether sulfone polymer comprise chlorine and alkoxy groups.

5. The polyarylene ether sulfone polymer according to claim 1, wherein terminal groups of the polyarylene ether sulfone polymer comprise chlorine groups and at least one of methoxy groups and aryloxy groups.

6. A mixture, comprising:
   I) the polyarylene ether sulfone polymer according to claim 1; and
   II) a polyvinylpyrrolidone.

7. The mixture according to claim 6, wherein the polyvinylpyrrolidone has a weight average molecular weight ($M_w$) ranging from 10,000 to 2,000,000 g/mol.

8. The mixture according to claim 6, wherein the polyarylene ether sulfone polymer (I) comprises repeat units of formula Ia:

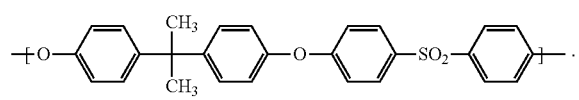

9. The mixture according to claim 6, wherein terminal groups of the polyarylene ether sulfone polymer (I) comprise halogen and alkoxy groups.

10. A method of reducing the polydispersity (Q) of a polyarylene ether sulfone polymer, the method comprising forming the polyarylene ether sulfone polymer in the presence of potassium carbonate having a volume-weighted average particle size of from 20 nm to 25 μm,
    wherein:
    the polydispersity (Q) of the polyarylene ether sulfone is reduced to 4 or less; and
    Q is defined as the quotient formed by dividing the number average molecular weight ($M_n$) into the weight average molecular weight ($M_w$), measured using gel permeation chromatography (GPC), using dimethylacetamide (DMAc) as solvent and narrowly distributed polymethyl methacrylate as standard.

11. The method according to claim 10, wherein the polydispersity (Q) of the polyarylene ether sulfone polymer is reduced to 3.5 or less.

12. The polyarylene ether sulfone polymer according to claim 1, which has a polydispersity (Q) from 2.0 to ≤3.5.

13. The polyarylene ether sulfone polymer according to claim 2, wherein terminal groups of the polyarylene ether sulfone polymer comprise halogen and alkoxy groups.

14. The polyarylene ether sulfone polymer according to claim 2, wherein terminal groups of the polyarylene ether sulfone polymer comprise chlorine and alkoxy groups.

15. The polyarylene ether sulfone polymer according to claim 2, wherein terminal groups of the polyarylene ether sulfone polymer comprise chlorine groups and at least one of methoxy groups and aryloxy groups.

16. The method according to claim 10, wherein the polyarylene ether sulfone polymer is formed by reaction over a time interval ranging from 2 to 12 hours.

17. The polyarylene ether sulfone polymer according to claim 1, which has a polydispersity (Q) from 2.5 to ≤4.

18. The polyarylene ether sulfone polymer according to claim 1, which has a polydispersity (Q) from 2.5 to ≤3.5.

* * * * *